United States Patent
Werneyer (10) Patent No.: US 10,523,644 B2
(45) Date of Patent: Dec. 31, 2019

(54) SYSTEM AND METHOD FOR SECURE DIGITAL SHARING BASED ON AN INTER-SYSTEM EXCHANGE OF A TWO-TIER DOUBLE ENCRYPTED DIGITAL INFORMATION KEY

(71) Applicant: SWISS REINSURANCE COMPANY LTD., Zurich (CH)

(72) Inventor: Oliver Werneyer, Zurich (CH)

(73) Assignee: SWISS REINSURANCE COMPANY LTD., Zurich (CH)

( * ) Notice: Subject to any disclaimer, the term of this patent is extended or adjusted under 35 U.S.C. 154(b) by 409 days.

(21) Appl. No.: 15/284,083

(22) Filed: Oct. 3, 2016

(65) Prior Publication Data
US 2017/0093826 A1    Mar. 30, 2017

Related U.S. Application Data

(63) Continuation of application No. PCT/EP2015/071621, filed on Sep. 21, 2015.

(51) Int. Cl.
*H04L 29/06* (2006.01)
*G06F 21/62* (2013.01)

(52) U.S. Cl.
CPC ........ *H04L 63/061* (2013.01); *G06F 21/6218* (2013.01); *H04L 63/0281* (2013.01); *H04L 63/0442* (2013.01)

(58) Field of Classification Search
CPC ... H04L 63/061; H04L 9/083; H04L 63/0281; H04L 63/0428; H04L 63/10; G06F 21/6218

(Continued)

(56) References Cited

U.S. PATENT DOCUMENTS 8,935,532 B2 * 1/2015 Mittal .................... G06F 21/10
                                                         380/281
9,722,974 B1 * 8/2017 Fuller ................. H04L 63/0428
(Continued)

OTHER PUBLICATIONS

Narendula, "Privacy-aware Publishing of Decentralized Access-Controlled Content", 2013, Ecole Polytechnique, pp. 1-167 (Year: 2013).*

*Primary Examiner* — Taghi T Arani
*Assistant Examiner* — Gregory A Lane
(74) *Attorney, Agent, or Firm* — Oblon, McClelland, Maier & Neustadt, L.L.P.

(57) ABSTRACT

A system based on layered, two-tier double cryptographic keys providing a closed cryptosystem within a secured network environment, the system including a digital key management device and a network node. The digital key management device generates a first-tier cryptographic key, a second-tier cryptographic key and makes the first-tier and second-tier cryptographic keys publicly accessible within a first and a second secured walled regions that are accessible to a network node registered to a first authentication database associated with an access server of the system, encrypts a first and second content with the first-tier and second-tier cryptographic keys, and generates encrypted first and second content. The network node requests access to the first secured walled region, accesses the first-tier and the second-tier cryptographic keys, decrypts the first and second content, generates first and second data containers based on the decrypted content, and transfers the data containers to a client device.

17 Claims, 3 Drawing Sheets

(58) Field of Classification Search
USPC .......................................................... 713/153
See application file for complete search history.

(56) References Cited

U.S. PATENT DOCUMENTS

| | | | |
|---|---|---|---|
| 9,762,386 B1* | 9/2017 | Nassaje | ................ H04L 9/0819 |
| 2002/0170053 A1* | 11/2002 | Peterka | ................ H04N 7/165 |
| | | | 725/31 |
| 2004/0151314 A1* | 8/2004 | Candelore | .............. H04N 7/163 |
| | | | 380/239 |
| 2006/0005258 A1* | 1/2006 | Hirose | ................ H04L 63/0457 |
| | | | 726/27 |
| 2010/0268936 A1* | 10/2010 | Matsushima | ........... G06F 21/62 |
| | | | 713/153 |
| 2010/0325734 A1* | 12/2010 | Etchegoyen | .......... G06F 21/121 |
| | | | 726/26 |
| 2010/0333213 A1* | 12/2010 | Etchegoyen | .......... G06F 21/105 |
| | | | 726/29 |
| 2013/0212704 A1* | 8/2013 | Shablygin | ........... G06F 21/6218 |
| | | | 726/28 |
| 2014/0181894 A1* | 6/2014 | Von Bokern | .......... H04L 63/061 |
| | | | 726/1 |
| 2016/0307274 A1* | 10/2016 | Sweeney | ............. G06F 3/04842 |

* cited by examiner

SYSTEM AND METHOD FOR SECURE DIGITAL SHARING BASED ON AN INTER-SYSTEM EXCHANGE OF A TWO-TIER DOUBLE ENCRYPTED DIGITAL INFORMATION KEY

CROSS-REFERENCE TO RELATED APPLICATION

This application is a Continuation of PCT International Application No. PCT/EP2015/071621, filed Sep. 21, 2015, the entire contents of which are incorporated herein by reference.

FIELD OF THE INVENTION

The present invention relates to systems for secure content sharing. More particularly, the invention relates to secure content distribution and/or publishing and/or aggregation, as well as secure content sharing between various authorized units. In general, the techniques described herein generally relate to secure content sharing, which can also involve integrated content licensing. More particular, the present invention relates to systems for securely transferring digital information for data sharing, in particular in an insurance underwriting system (UW). More particular, it is a system providing secure digital sharing of underwriting decision, policyholder information as well as other data needed to issue a policy, as e.g. underwriting decisions, exclusions, loadings, critical values, notes for claims, names, surnames, email addresses, phone numbers, addresses, ages, genders, smoker status, etc. In general, the invention discloses a system for defending information from unauthorized access, use, disclosure, disruption, modification, perusal, inspection, recording or destruction during the process of confidential and use sensitive data exchange, as for instance used for secure insurance underwriting (UW), banking data exchanges, health data exchanges or other exchanges of highly sensitive data. The related fields also involve especial the field of secured data transmission systems related to medical services where sharing of health information is regulated and sensitive; the field of automated conducted commerce, namely e-commerce, where big part of shopping online is that people want personalized services but not share all personal details; and finally to the field of automated cross-selling platforms, especially related to the various commercial activities focused at cross-selling products to own customers or across to other customers.

RELATED ART

Key management solutions or systems (KMS), as well as digital rights management (DRM) refers to access control technologies used by hardware manufacturers, content provider, publishers, copyright holders or others to control use of digital content. DRM is generally used to describe any technology that inhibits use of the digital content that is not desired or intended by the content provider. In some DRM implementations, the ability to control distribution is tied to the content itself and content providers may require an unit, requesting access, e.g. controlled by a possible consumer, to authenticate using appropriate credentials, as e.g. username and password or other login credentials or electronic identification, authentication and/or authorization means, to gain access to the content. Usernames and passwords can be forgotten, compromised or shared, limiting the effectiveness of such DRM implementations. Alternatively or additionally, DRM implementations can be largely limited to audio and video content, on captive formats, on captive platforms, and/or with captive and cumbersome software development kits (SDKs). These factors can limit the types of content that may be distributed and/or the size of the audience that can be reached for such content or that can access the content.

Key management systems (KMS) typically provide for the management of cryptographic keys in a cryptosystem. This includes dealing with the generation, exchange, storage, use, and replacement of keys. It includes cryptographic protocol design, key servers, user procedures, and other relevant protocols. Key management systems handle keys at the user level, e.g. between users or systems. In contrast, key scheduling typically refers to the internal handling of key material within the operation of a cipher. Successful key management is critical to the security of a cryptosystem. Even, in practice, it is arguably that this is the most difficult aspect of cryptography systems because it involves system policy, user training, organizational and departmental interactions, and coordination between all of these elements.

In the state of the art, prior art cryptographic systems use different types of keys. These may include symmetric keys or asymmetric keys. In a symmetric key algorithm the keys involved are identical for both encrypting and decrypting a message. Keys must be chosen carefully, and distributed and stored securely. Asymmetric keys, in contrast, are two distinct keys that are mathematically linked. They are typically used in conjunction to communicate. Prior to any secured communication, the systems must set up the details of the cryptography. In some instances this may require exchanging identical keys (in the case of a symmetric key system). In others it may require possessing the other party's public key. While public keys can be openly exchanged (their corresponding private key is kept secret), symmetric keys must be exchanged over a secure communication channel. A long time, exchange of such a key was extremely difficult, however, it was eased by access to secure channels such as a diplomatic bag. Clear text exchange of symmetric keys would enable any interceptor to immediately learn the key, and any encrypted data. Furthermore, the advance of public key cryptography made the exchange of keys less troublesome. Since the Diffie-Hellman key exchange protocol, it has even become possible to exchange a key over an insecure communications channel, which has substantially reduced the risk of key disclosure during distribution. It is possible, using something akin to a book code, to include key indicators as clear text attached to an encrypted message. The encryption technique used by Richard Sorge's code clerk is of this type, referring to a page in a statistical manual, though it was in fact a code. The basic for such systems was already used by the famous German Army Enigma using a mixed type of symmetric encryption key. Thus, the key was a combination of secretly distributed key schedules and a user chosen session key component for each message. Nowadays, modern systems, such as OpenPGP compatible systems, a session key for a symmetric key algorithm is distributed encrypted by an asymmetric key algorithm. This approach avoids the necessity for using a key exchange protocol like Diffie-Hellman key exchange.

In the state of the art, another method of key exchange comprises encapsulating one key within another. Typically a master key is generated and exchanged using some secure method. This method is usually expensive (breaking a master key into multiple parts and sending each with a trusted courier for example) and not suitable for use on a larger scale. Once the master key has been securely exchanged, it can then be used to securely exchange subsequent keys with ease. This technique is usually termed Key Wrap. A common technique uses Block ciphers and cryptographic hash functions. Finally, another system and method is based upon exchanging a master key (sometimes termed a root key) and derive subsidiary keys as needed from that key and some other data (often referred to as diversification data). The most common use for this method is probably in SmartCards or SIM-Cards based cryptosystems, such as those found in banking cards. The bank or credit network embeds their secret key into the card's secure key storage during card production at a secured production facility. Then at the Point of sale the card and card reader are both able to derive a common set of session keys based on the shared secret key and card-specific data (such as the card serial number). This method can also be used when keys must be related to each other (i.e., departmental keys are tied to divisional keys, and individual keys tied to departmental keys). However, tying keys to each other in this way increases the damage, which may result from a security breach, as attackers will learn something about more than one key. This reduces entropy, with regard to an attacker, for each key involved.

The subject matter claimed herein is not limited to embodiments that solve any disadvantages or that operate only in environments such as those described above. Rather, the background information is only provided to illustrate one field of technology where the invention described herein can be applied.

SUMMARY OF THE INVENTION

It is one object of the present invention to provide a system and method for providing a closed cryptosystem for secure content distribution within a secured network environment, which does not have the aforementioned drawbacks. In particular, it is meant to be possible to provide an apparatus and method for automated and differentiated access and billing control within a two-tier double encrypted system.

The present invention achieves this aim particularly by means of the elements of the independent claims. Further advantageous embodiments can also be found in the dependent claims and the description.

In particular, these aims are achieved by the invention in that for the system providing a closed cryptosystem for secure content distribution within a secured network environment based on layered, two-tier double cryptographic keys, in that a first-tier cryptographic key is generated and made public accessible within a first secured walled region, wherein the first secured walled region is accessible to supply network nodes registered to a first authentication database associated with an access server of the digital key management system, in that via a network interface a network node requests access to the first secured walled region, wherein the access server enables access to the first secured walled region to the supply network node upon authentication and/or authorization by means of the first authentication database, in that the digital key management system encrypts a first content with the first-tier cryptographic key to generate encrypted first content, wherein the first-tier cryptographic key is accessed by the supply network node accessing the secured walled region and wherein the encrypted first content is accessed and decrypted by the network node using the first-tier cryptographic key, in that a first data container is generated by the supply network node based on the decrypted first content and transferred to a client device, wherein the client device is assigned to the first-tier cryptographic key by means of the digital key management system and wherein the assignment is accessible to the network nodes registered to the first authentication database, in that the client device transfers an acceptance-confirmation of the content of the first data container by responding to the digital key management system via a network interface, wherein a second-tier cryptographic key is generated and made public accessible to the supply network node within a second secured walled region by means of the digital key management system, in that via the network interface the supply network node requests access to the second secured walled region, wherein the access server enables access to the second secured walled garden for the supply network node upon authentication and/or authorization by means of a second authentication database associated with the access server of the digital key management system, in that the digital key management system encrypts a second content with the second-tier cryptographic key to generate encrypted second content, wherein the second-tier cryptographic key is accessed by the network node accessing the secured second walled region and wherein the encrypted second content is accessed and decrypted by the supply network node using the second-tier cryptographic key, and in that a second data container is generated by the supply network node based on the decrypted second content and transferred to the client device, wherein the client device transfers a second acceptance-confirmation of the content of the second data container by responding to the digital key management system and/or to the network node via the network interface of the client device. The first secured walled region and/or the second secured walled region can e.g. be realized as a secured network region or a secured memory region blocked by controlling data transfers using a secure gateway control unit or another network access control mechanisms, and Memory Management Units (MMUs) or another memory access control mechanisms, respectively. This has inter alia the advantage that specific types of attacks more easily can be blocked by controlling data transfers on the access server using Memory Management Units (MMUs) and other access control mechanisms. Further, the first and/or second acceptance-confirmation can e.g. be realized as transfer of a secured data packet structure comprising the acceptance-confirmation. The secured packets can e.g. contain application messages to which specific mechanisms are applicable, wherein the application messages comprise commands and/or data exchanged between an application resident in the digital key management system, and wherein a sending/receiving entity of the digital key management system applies appropriate security mechanisms to the application messages by turning them into the secured packets. The authentication and/or authorization by means of the first authentication database can e.g. comprise receiving a license number associated with the network node, and retrieving a hardware fingerprint associated with the network node based on the license number, the hardware fingerprint being a unique identifier associated with the network node, and determining that the network node is registered with digital key management system based on one or more of the hardware fingerprint and the license number. The present invention has inter alia the advantage that it allows the digital sharing of underwriting decisions, policyholder information as well as other data needed to issue a policy, as e.g. underwriting decision, exclusions, loadings, critical values, notes for claims, name, surname, email address, phone number, address, age, gender, etc. However, it generally allows to exchange secure information between two systems step-wise controlled and e.g. dedicated, step-wise billed by a third supervising system, i.e. the digital key management system. A further advantage is related to the field of secured data transmission systems related to medical services where sharing of health information is regulated and sensitive. An example is where a patient needs to be treated for an injury (e.g. back injury form falling) and was taken into the emergency room at the hospital, the emergency room system should be able to share the information of the patient (first half) that is required to find them an appointment with a treatment specialist (e.g. age, gender, injury description, severity, urgency). Once a specialist responds with an appointment offer and the patient chooses to go there (or is forced to go) only then the personal information (second half) is shared to fully register the patient with the doctor's office. Thus, in view of applying the present inventive system to the field of medical services, it has inter alia the advantages providing the technical means for sharing of non-sensitive data for faster response or processing, while securely handling of personal health data. The patient can have peace of mind when using and distributing personal medical information. Further, the system provides an efficient and cost effective way to share sensitive data, and finally it also provides a recordable and traceable way of getting customer consent to share data. Other advantages relate to the field of automated conducted commerce, namely e-commerce, where big part of shopping online is that people want personalized services but not share all personal details. The present invention based on the double-layered digital key allows the user to share information about themselves that will allow companies to present tailored offers without needing personal details of the individual (name, address, telephone number, etc.) which are not actually relevant to the offer. Once a client chooses to take up the offer they are then willing to share the rest of the information to cash in the offer. Retailers/companies can thus get better access to details from possible clients to tailor the product. Thus, related to the field of e-commerce, the present invention allows sharing of non-sensitive data for faster response or processing, while securely handling of personal data. The invention allows for more tailored offers for individuals without sacrificing personal information, which is not possible by the known prior art systems. Further, the invention allows a very fast and secure way to conclude the transaction once the client wants to conclude it, it creates an efficient and cost effective way to share sensitive data; and a recordable and traceable way of getting customer consent to share data. Finally but not terminally, related to the field of automated cross-selling platforms, the present invention has the following advantages, especially related to the various commercial activities focused at cross-selling products to own customers or across to other customers: Typically it is easier to target own customers with more detailed offers, however, it gets very difficult to sell other company's product in your space or cross-sell your product into another company's user group. The present invention based on the double-layered digital key is able to open this opportunity in a unique way and keep customer data safe in a cheap and secure way. Only that non-identifiable data (i.e. cannot identify the individual) is shared with 3rd party service providers that enables them to compile an offer the individual. If the individual chooses to take up the offer, they will be notified what information will be shared. If they agree (and thus have given express consent) then this cross-platform cross-company up-sell activity can be conducted in a safe, cheap and productive manner by means of the inventive system of the present invention. Therefore, related to automated cross-selling platforms, the present invention has inter alia the advantages of sharing of non-sensitive data for faster, personalized offers from many sources, while securely handling of personal data (health or otherwise). Further, the invention has the advantage of providing the technical means allowing more tailored offers for individuals without sacrificing personal information; a very fast and secure way to conclude the transaction once the client wants to conclude it; an efficient and cost effective way to share sensitive data; and finally a recordable and traceable way of getting customer consent to share data.

In one variant embodiment, a billing module accesses the access server by means of a billing gateway interface, first access detail records of the supply network node being transmitted from the access server to the billing module, and the billing gateway interface comprising an assigned billing management database with first access and billing control data of each supply network node based on the access of the supply network node to the first-tier cryptographic key and/or encrypted first content. The first access detail records can e.g. be generated by means of the billing module upon the authentication and/or authorization by means of the first authentication database. Further, by means of the billing gateway interface, the billing module can e.g. accesses the access server, second access detail records of the supply network node being transmitted from the access server to the billing module, and the billing management database comprising second access control data of each supply network node based on the access of the supply network node to the second-tier cryptographic key and/or encrypted second content. The second access detail records can e.g. be generated by means of the billing module upon the authentication and/or authorization by means of the second authentication database.

In another variant embodiment, the billing module bills the access to the first-tier cryptographic key and/or the second-tier cryptographic key obtained by the supply network node based. As a further variant, only access to the second-tier cryptographic key and/or encrypted second content can e.g. be billed by means of the billing module, while the first-tier cryptographic key is made public accessible within a first secured walled region without billing.

In a further variant embodiment, the encryption of the first content with the first-tier cryptographic key and the encryption of the second content with the second-tier cryptographic key can e.g. using a single type of encryption, wherein the digital key management system provides the encrypted content to the network node associated with the first-tier cryptographic key and the second-tier cryptographic key, and wherein the first-tier cryptographic key and the second-tier cryptographic key is encrypted based on the hardware fingerprint of the network node and a private key stored at the network node. Further, a first data stream including the encrypted first data content can e.g. be generated by the digital key management system and a locator for the encrypted first data content, and wherein a second data stream including the first cryptographic key and the locator of the content is generated by the digital key management system. A third data stream including the encrypted second data content can e.g. be generated by the digital key management system and a locator for the encrypted first data content, and wherein a third data stream including the second cryptographic key and the locator of the content is generated by the digital key management system. Finally, the private key stored on the network node can e.g. be in an encrypted format wherein the network node decrypts the encrypted private key at the network node using a key derived from a the hardware fingerprint of the network node, and wherein the network node decrypts the encrypted first cryptographic key and/or second cryptographic key using the decrypted stored private key.

In a variant embodiment, the second data container comprises different policies and each of the different policies controls consumption of automatic risk transfer from the client device to the network node.

In another variant embodiment, the first secured walled region and/or the second secured walled region are segregated physically and/or logically from the rest of the digital key management system.

It should be stated that the present invention relates not only to the inventive method but also to a system for carrying out this method and to a corresponding computer program product.

Variant embodiments of the present invention are described below with reference to examples. The examples of the embodiments are illustrated by the following appended figures.

Figure 1:
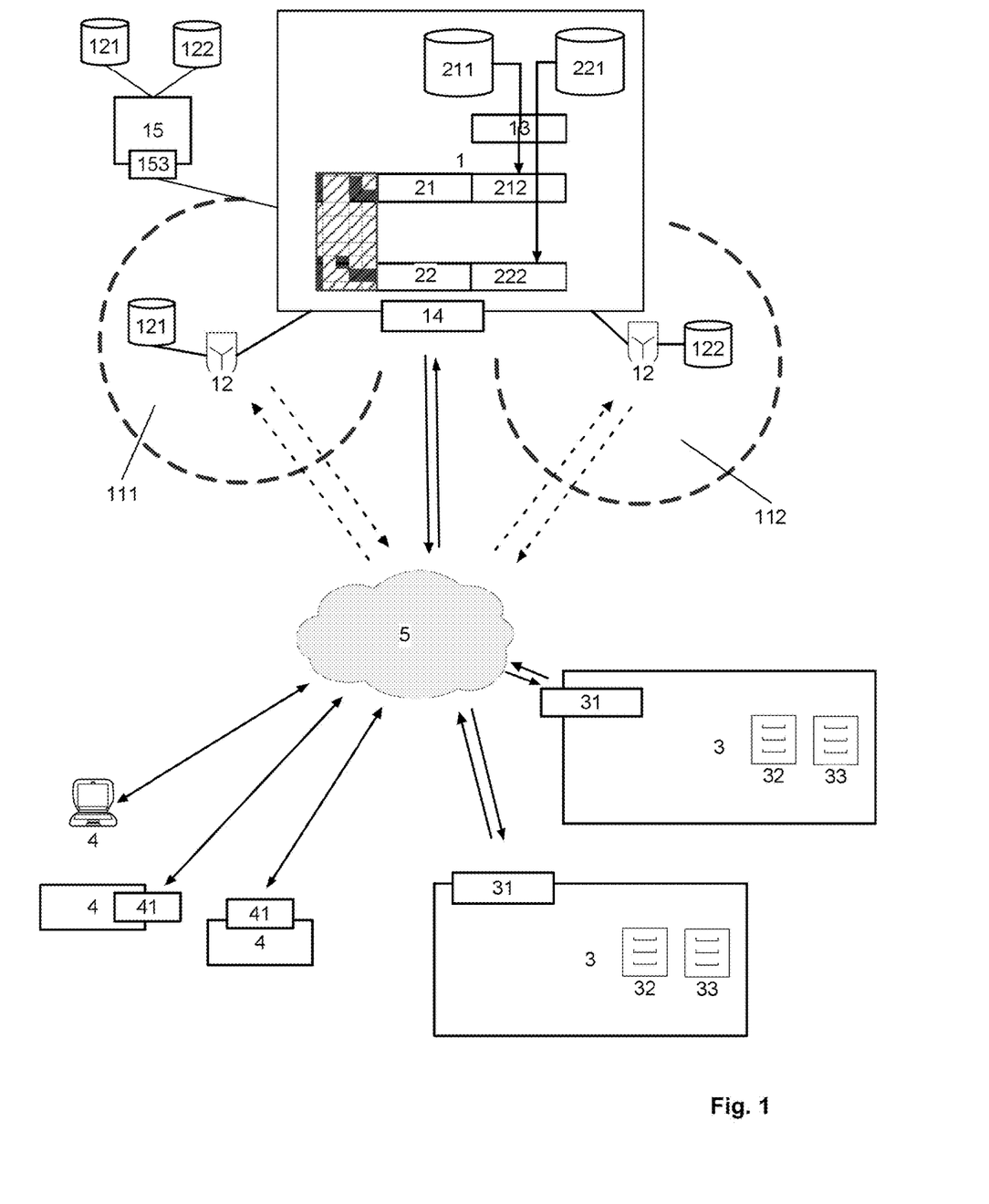
FIG. 1 shows a block diagram which schematically illustrating an exemplary embodiment of a digital key management system 1 based on layered, two-tier double cryptographic keys 2 providing a closed cryptosystem for secure content distribution within a secured network environment 11. A first-tier cryptographic key 21 is generated and made public accessible within a first secured walled region 111, wherein the first secured walled region 111 is accessible to supply network nodes 3 registered to a first authentication database 121 associated with an access server 12 of the digital key management system 1. A second-tier cryptographic key 22 is generated accessible by the network node 3 accessing a secured second walled region 112. The first and second-tiers of the cryptographic key 21 is used to encrypt and decrypt first and second content 211/221 transferred to a supply network node 3.
Figure 2:
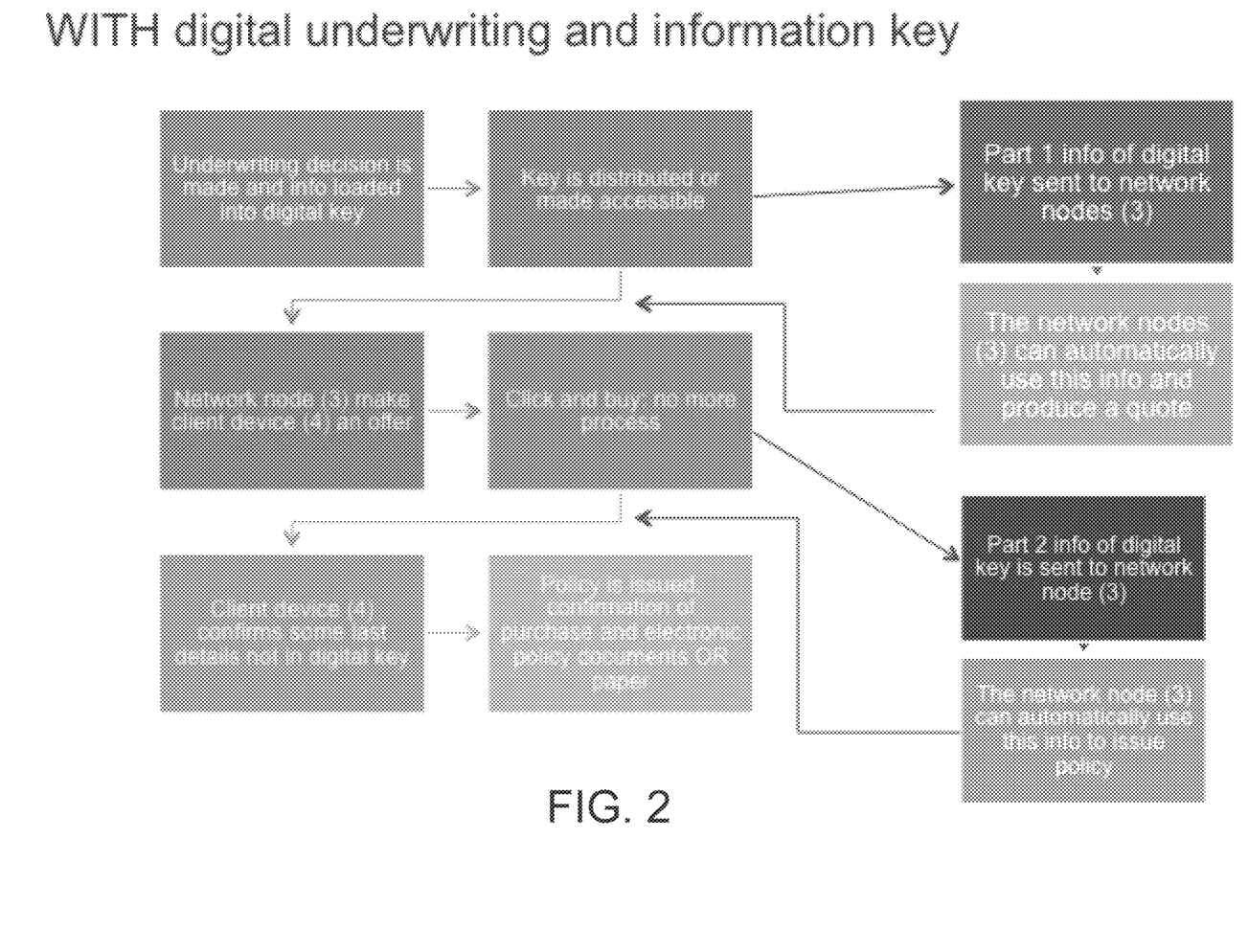
FIG. 2 show a block diagram, which schematically illustrates the digital key management system 1 using the double-tier cryptographic key 2 as digital underwriting and information key.
Figure 3:
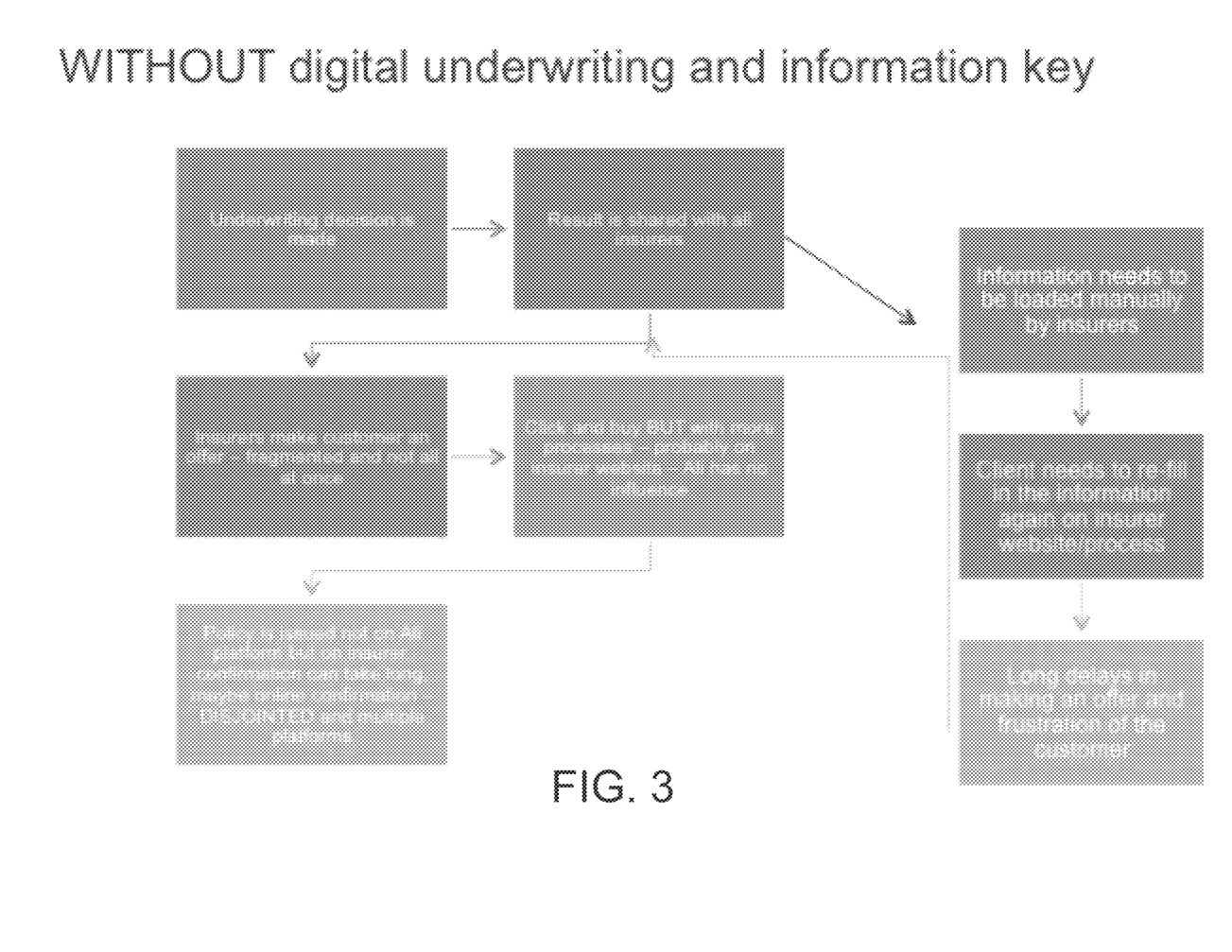
FIG. 3 show a block diagram, which schematically illustrates the system of the state of the art, which are not using a digital underwriting and information key.

FIG. 1 schematically illustrates an architecture for a possible implementation of an embodiment of the digital key management system 1 providing a closed cryptosystem for secure content distribution within a secured network environment 11 based on layered, two-tier cryptographic keys 2. A first-tier cryptographic key 21 is generated and made public accessible within a first secured walled region 111 The first secured walled region 111 is accessible to supply network nodes 3 registered to a first authentication database 121 associated with an access server 12 of the digital key management system 1 via the data transmission network 5. By way of example, the transmission can be effected via said network 5. The communication network 5 can comprise a GSM or UMTS network, for example, or a satellite-based mobile radio network and/or one or more landline networks, for example the public switched telephone network, the worldwide Internet or suitable LAN (Local Area Network) or WAN (Wide Area Network). In particular, it also comprises ISDN and XDSL connections. The digital key management system 1 comprises the necessary electronic circuits used to generate the appropriate data signal.

By means of a network interface 31, a network node 3 requests access to the first secured walled region 111, wherein the access server 12 enables access to the first secured walled region 111 to the supply network node 3 upon authentication and/or authorization by means of the first authentication database 212. As a possible realization, the authentication and/or authorization by means of the first authentication database 212 can e.g. comprise receiving a license number associated with the network node 3, and retrieving a hardware fingerprint associated with the network node 3 based on the license number, the hardware fingerprint being a unique identifier associated with the supply network node 3, and determining that the supply network node 3 is registered with digital key management system 1 based on one or more of the hardware fingerprint and the license number. The digital key management system 1 encrypts a first content 211 with the first-tier cryptographic key 21 generating encrypted first content 212.

As an variant embodiment, the digital key management system 1 and/or the encryption/decryption-unit 13 comprises means for encrypted and access-controlled transmission of the layered cryptographic keys 2 and the associated first and/or second data content 211/221 and/or the first and/or second data container 32/33, where the access-controlled transfer of the data can be decrypted by generating a data token in line with transmitted access request data and transmitting it to the supply network node 3 and/or client device 4, the data token comprising data which comprise at least portions of an appropriate key for the access-controlled encrypted data transfer, or comprising an access permit for a key for decrypting the data signal transferred. This variant embodiment has, inter alia, the advantage that the apparatus allows a high security standard and a technically stable response in the exchange between the various components. By way of example, the data token may be encrypted and/or electronically signed. In particular, the encryption can be performed using public key cryptography, particularly SSL (Secure Sockets Layer) or HTTPS, for example. The first-tier cryptographic key 21 is accessed by the supply network node 3 within the first secured walled region 111 and the encrypted first content 212 is decrypted by the network node 3 using the first-tier cryptographic key 21. A first data container 32 is generated by the supply network node 3 based on the decrypted first content 211 and transferred to a client device 4, wherein the client device 4 is assigned to the first-tier cryptographic key by means of the digital key management system 1. The assignment is accessible to the network nodes 3 registered to the first authentication database 121. The client device 4 transfers an acceptance-confirmation of the content of the first data container 32 by responding to the digital key management system 1 via a network interface 41.

A second-tier cryptographic key 22 is generated and made public accessible to the supply network node 3 within a second secured walled region 112 by means of the digital key management system 1. Thus, the layered cryptographic key 2, comprising the first-tier cryptographic key 21 and the second-tier cryptographic key 22 is a two-tier double encrypted digital information key, wherein two-tier can e.g. mean for risk-transfer related realizations, that the first part contains info to prepare a quite, and the second part to issue policy. These can e.g. be released separately and at different costs. Especially, double encrypted means in the present case, that the first part and second part use different encryptions. The digital key management system 1 can e.g. make the code/API (application programming interface) available publically for any supply network node 3, e.g. for any automated insurance system, to use. In this case, the digital key management system 1 can make publically available, how the key can be used. Supply network nodes 3 register to use the key, however as a variant, no limits are applied or only formal limitations, as e.g. that the automated insurance system must have an insurance license. This has inter alia the advantage that it allows multiple supply network nodes 3 to make policy offers automatically to a single client device 4. The first secured walled region 111 and/or the second secured walled region 111 can e.g. be realized as a secured network region or a secured memory region blocked by controlling data transfers using a secure gateway control unit or another network access control mechanisms, and Memory Management Units MMUs or another memory access control mechanisms, respectively. As embodiment variant, the first secured walled region 111 and/or the second secured walled region 112 can e.g. be segregated physically and/or logically from the rest of the digital key management system 1. Via the network interface 31, the supply network node 3 requests access to the second secured walled region 112, wherein the access server 3 enables access to the second secured walled garden 112 for the supply network node 3 upon authentication and/or authorization by means of a second authentication database 122 associated with the access server 12 of the digital key management system 1.

As a possible realization, the encryption of the first content 211 with the first-tier cryptographic key 21 and the encryption of the second content 221 with the second-tier cryptographic key 22 can e.g. use a single type of encryption, wherein the digital key management system 1 provides the encrypted content to the network node 3 associated with the first-tier cryptographic key 21 and the second-tier cryptographic key 21, and wherein the first-tier cryptographic key 21 and the second-tier cryptographic key 21 is encrypted based on the hardware fingerprint of the network node 3 and a private key stored at the network node 3. For this embodiment variant, a first data stream including the encrypted first data content 212 can e.g. be generated by the digital key management system 1 and a locator for the encrypted first data content 212, and a second data stream including the first cryptographic key 21 and the locator of the content can e.g. be generated by the digital key management system 1. Also a third data stream including the encrypted second data content 222 can e.g. be generated by the digital key management system 1 and a locator for the encrypted first data content 222, and a third data stream including the second cryptographic key 21 and the locator of the content can e.g. be generated by the digital key management system 1. The private key stored on the network node 3 can e.g. be in an encrypted format and the supply network node 3 decrypts the encrypted private key at the network node 3 using a key derived from a the hardware fingerprint of the network node 3, and the supply network node 3 decrypts the encrypted first cryptographic key 21 and/or second cryptographic key 22 using the decrypted stored private key.

The digital key management system 1 encrypts a second content 221 with the second-tier cryptographic key 22 to generate encrypted second content 222. The second-tier cryptographic key 22 is accessed by the network node 3 accessing the secured second walled region 112, wherein the encrypted second content 222 is accessed and decrypted by the supply network node 3 using the second-tier cryptographic key 22. The second data container 33 can e.g. comprise different policies and each of the different policies controls consumption of automatic risk transfer from the client device 4 to the network node 3. A second data container 33 is generated by the supply network node 3 based on the decrypted second content 221 and transferred to the client device 4. The client device 4 transfers a second acceptance-confirmation of the content of the second data container 33 by responding to the digital key management system 1 and/or to the network node 3 via the network interface 41 of the client device 4. The first and/or second acceptance-confirmation can e.g. be realized as transfer of a secured data packet structure comprising the acceptance-confirmation. Said secured packets can e.g. contain application messages to which specific mechanisms are applicable, wherein the application messages comprise commands and/or data exchanged between an application resident in the digital key management system 1), and wherein a sending/receiving entity of the digital key management system 1 applies appropriate security mechanisms to the application messages by turning them into the secured packets.

By means of a billing gateway interface 153, a billing module 15 can e.g. access the access server 12, first access detail records 151 of the supply network node 3 being transmitted 1011 from the access server 12 to the billing module 15. The billing gateway interface 153 comprises an assigned billing management database 154 with first access and billing control data 1541 of each supply network node 3 based on the access of the supply network node 3 to the first-tier cryptographic key 21 and/or encrypted first content 212. The first access detail records 151 can e.g. be generated by means of the billing module 15 upon the authentication and/or authorization by means of the first authentication database 212. By means of the billing gateway interface 153, the billing module 15 can access the access server 12. Second access detail records 152 of the supply network node 3 are transmitted 1011 from the access server 12 to the billing module 15, and the billing management database 154 comprising second access control data 1542 of each supply network node 3 based on the access of the supply network node 3 to the second-tier cryptographic key 22 and/or encrypted second content 222. The second access detail records 152 can e.g. also be generated by means of the billing module 15 upon the authentication and/or authorization by means of the second authentication database 222. The billing module 15 can e.g. bill the access to the first-tier cryptographic key 21 and/or the second-tier cryptographic key 22 obtained by the supply network node 3 based. The billing can e.g. be provided by transmitting appropriately generated TAP files to a billing service provider. As a variant, only the access to the second-tier cryptographic key 22 and/or encrypted second content 222 is billed by means of the billing module 15, while the first-tier cryptographic key 21 is made public accessible within a first secured walled region 111 without billing. This has inter alia the advantage that, in the case of risk transfer systems, the digital key management system 1 and method allows using and billing UW expertise to compile a risk assessment component for a provider, which in this case is the service charged. The inventive system also allows for various revenue options, as e.g. (i) dedicated license fees, (ii) per use fees, e.g. each time a supply network node 3 e.g. an automated insurance system, creates a quote using the first part 21 of the two-tier cryptographic key 2, the supply network node 3 pays a fee, for example $1. This fee can be shared with a third party, or (iii) per sale, e.g. each time a supply network node 3 e.g. an automated insurance system, makes a sale using the second part 22 of the two-tier cryptographic key 2, the supply network node 3 pays or is billed a fee, e.g. $29. Also this fee can e.g. be shared with a third party. As embodiment variant, client management modules can e.g. intervene for control proposes having the possibility to waive some or all of the fees in return for securing reinsurance treaties.

REFERENCE LIST

1 Digital key management system
11 Secured network environment
111 First secured walled region
112 Second secured walled region
12 Access server
121 First authentication database
122 Second authentication database
13 Encryption/Decryption-Unit
14 Network interface
15 Billing module
151 First access detail records
152 Second access detail records
153 Billing gateway interface
154 Billing management database
1541 First access and billing control data
1542 Second access and billing control data
2 Layered cryptographic keys
21 First cryptographic key
211 First data content
212 Encrypted first data content
22 Second cryptographic key
221 Second data content
222 Encrypted second data content
3 Supply network nodes
31 Network interface
32 First data container
33 Second data container
4 Client device
41 Network interface
5 Data-transmission network

The invention claimed is:

1. A system based on layered, two-tier double cryptographic keys providing a closed cryptosystem for secure content distribution within a secured network environment, the system comprising:
a digital key management device including digital key management circuitry configured to generate a first-tier cryptographic key and make the first-tier cryptographic key publicly accessible within a first secured walled region, wherein the first secured walled region is accessible to a supply network node registered to a first authentication database associated with an access server of the system, encrypt first content with the first-tier cryptographic key, generate encrypted first content,
generate a second-tier cryptographic key and make the second-tier cryptographic key publicly accessible to the supply network node within a second secured walled region,
encrypt second content with the second-tier cryptographic key, and generate encrypted second content,
supply network nodes including node circuitries configured to request, via a network interface, access to the first secured walled region, wherein the access server enables access to the first secured walled region for the supply network node upon authentication and/or authorization by the first authentication database, the first secured walled region being accessible to any supply network node registered to the first authentication database associated with the access server of the system,
access the first-tier cryptographic key via the first secured walled region, access and decrypt the encrypted first content using the first-tier cryptographic key,
generate a first data container based on the decrypted first content, transfer the first data container to a client device, wherein the digital key management circuitry assigns the client device the first-tier cryptographic key, and wherein the assignment is accessible to the supply network nodes registered to the first authentication database,
request access to the second secured walled region, wherein the access server enables access to the second secured walled region for the supply network nodes upon authentication and/or authorization from a second authentication database associated with the access server,
access the second-tier cryptographic key via the secured second walled region, access and decrypt the encrypted second content using the second-tier cryptographic key,
generate a second data container based on the decrypted second content, and transfer the second data container to the client device, wherein the digital key management circuitry is further configured to receive a first acceptance-confirmation of the content of the first data container, via the network interface, from the client device, and receive a second acceptance-confirmation of the content of the second data container, via the network interface, from the client device.

2. The system according to claim 1, further comprising:
a billing gateway interface including billing gateway circuitry configured to access the access server and retrieve first access detail records of the supply network node; and
an assigned billing management database with first access and billing control data of each supply network node based on the access of the supply network node to the first-tier cryptographic key and/or encrypted first content.

3. The system according to claim 2, wherein the first access detail records are generated upon the authentication and/or authorization from the first authentication database.

4. The system according to claim 2, wherein the billing gateway circuitry is further configured to:
access the access server and retrieve second access detail records of the supply network node,
the billing management database comprising second access control data of each supply network node based on the access of the supply network node to the second-tier cryptographic key and/or encrypted second content.

5. The system according to claim 4, wherein the second access detail records are generated upon the authentication and/or authorization by the second authentication database.

6. The system according to claim 5, wherein the billing gateway circuitry is further configured to bill the supply network node for the access to the obtained first-tier cryptographic key and/or the obtained second-tier cryptographic key.

7. The system according to claim 6, wherein only access to the second-tier cryptographic key and/or encrypted second content is billed, while the first-tier cryptographic key is made publicly accessible within the first secured walled region without billing.

8. The system according to claim 1, wherein the first secured walled region and/or the second secured walled region is realized as a secured network region or a secured memory region blocked by controlling data transfers using a secure gateway control circuit or a Memory Management Unit (MMU).

9. The system according to claim 1, wherein the first and/or second acceptance-confirmation is realized as transfer of a secured data packet structure comprising the acceptance-confirmation.

10. The system according to claim 9, wherein the secured data packet structure includes secured packets containing application messages to which specific mechanisms are applicable,
- wherein the application messages comprise commands and/or data exchanged between an application resident in the digital key management circuitry, and
- wherein the digital key management circuitry is further configured to apply one or more security mechanisms to the application messages to turn the application messages into secured packets.

11. The system according to claim 10, wherein the first authentication database includes first authentication circuitry configured to:
- receive a license number associated with the supply network node,
- retrieve a hardware fingerprint associated with the supply network node based on the license number, the hardware fingerprint being a unique identifier associated with the supply network node, and
- determine whether the supply network node is registered with the digital key management circuitry based on the hardware fingerprint and the license number.

12. The system according to claim 1, wherein the encryption of the first content with the first-tier cryptographic key and the encryption of the second content with the second-tier cryptographic key uses a single type of encryption,
- wherein the digital key management circuitry is further configured to provide the encrypted content to the supply network node associated with the first-tier cryptographic key and the second-tier cryptographic key, and
- wherein the first-tier cryptographic key and the second-tier cryptographic key are encrypted based on a hardware fingerprint of the supply network node and a private key stored at the supply network node.

13. The system according to claim 12, wherein the digital key management circuitry is further configured to:
- generate a first data stream including the encrypted first data content,
- generate a locator for the encrypted first data content, and
- generate a second data stream including the first cryptographic key and the locator of the content.

14. The system according to claim 12, wherein the digital key management circuitry is further configured to:
- generate a third data stream including the encrypted second data content,
- generate a locator for the encrypted first data content, and
- generate a third data stream including the second cryptographic key and the locator of the content.

15. The system according to claim 12, wherein the private key stored in the supply network node is in an encrypted format, and
- wherein the node circuitry is further configured to
  - decrypt the encrypted private key using a key derived from a the hardware fingerprint of the supply network node, and
  - decrypt the encrypted first cryptographic key and/or second cryptographic key using the decrypted stored private key.

16. The system according to claim 1, wherein the second data container comprises different policies, wherein each of the different policies controls consumption of automatic risk transfer between the supply network node and the client device.

17. The system according to claim 1, wherein the first secured walled region and/or the second secured walled region are segregated physically and/or logically from the rest of the system.

* * * * *